United States Patent [19]
Lagier

[11] Patent Number: 5,003,132
[45] Date of Patent: Mar. 26, 1991

[54] CONTROL LEVER FOR A MOTOR VEHICLE

[75] Inventor: Daniel Lagier, Nanterre, France

[73] Assignee: Jaeger, Levallois-Perret, France

[21] Appl. No.: 403,610

[22] Filed: Sep. 6, 1989

[30] Foreign Application Priority Data

Sep. 8, 1988 [FR] France .................. 88 11745

[51] Int. Cl.[5] .................. H01H 9/00; B60R 16/00
[52] U.S. Cl. .................. 200/4; 200/61.27; 200/61.54
[58] Field of Search .......... 200/4, 5 R, 11 A, 61.21, 200/61.3, 61.34, 61.35, 61.54

[56] References Cited

U.S. PATENT DOCUMENTS

| | | | |
|---|---|---|---|
| 3,064,494 | 11/1962 | Brewster | 74/504 |
| 3,499,125 | 3/1970 | Stoi | 200/4 |
| 3,511,943 | 5/1970 | Kibler | 200/61.54 X |
| 4,052,573 | 10/1977 | Kojima et al. | 200/11 A |

FOREIGN PATENT DOCUMENTS 0160905 11/1985 European Pat. Off. .
2531696 3/1977 Fed. Rep. of Germany .

Primary Examiner—J. R. Scott

[57] ABSTRACT

The present invention provides a control lever, in particular for a motor vehicle, the control lever comprising a fixed body (100), a first control ring (200) mounted to rotate on the body (100) and provided with a first circuit board (260) extending generally perpendicularly to its axis of rotation (102), a second control ring (300) coaxial with the first, mounted to rotate on the body (100), and provided with a second circuit board (350) extending generally perpendicularly to its axis of rotation, and at least one electrical conductor (450) extending generally parallel to the axis of rotation (102) of the rings and prevented from rotating relative to the body (100), with respective ends thereof resting in rubbing contact against each of the two circuit boards (260, 350).

22 Claims, 3 Drawing Sheets

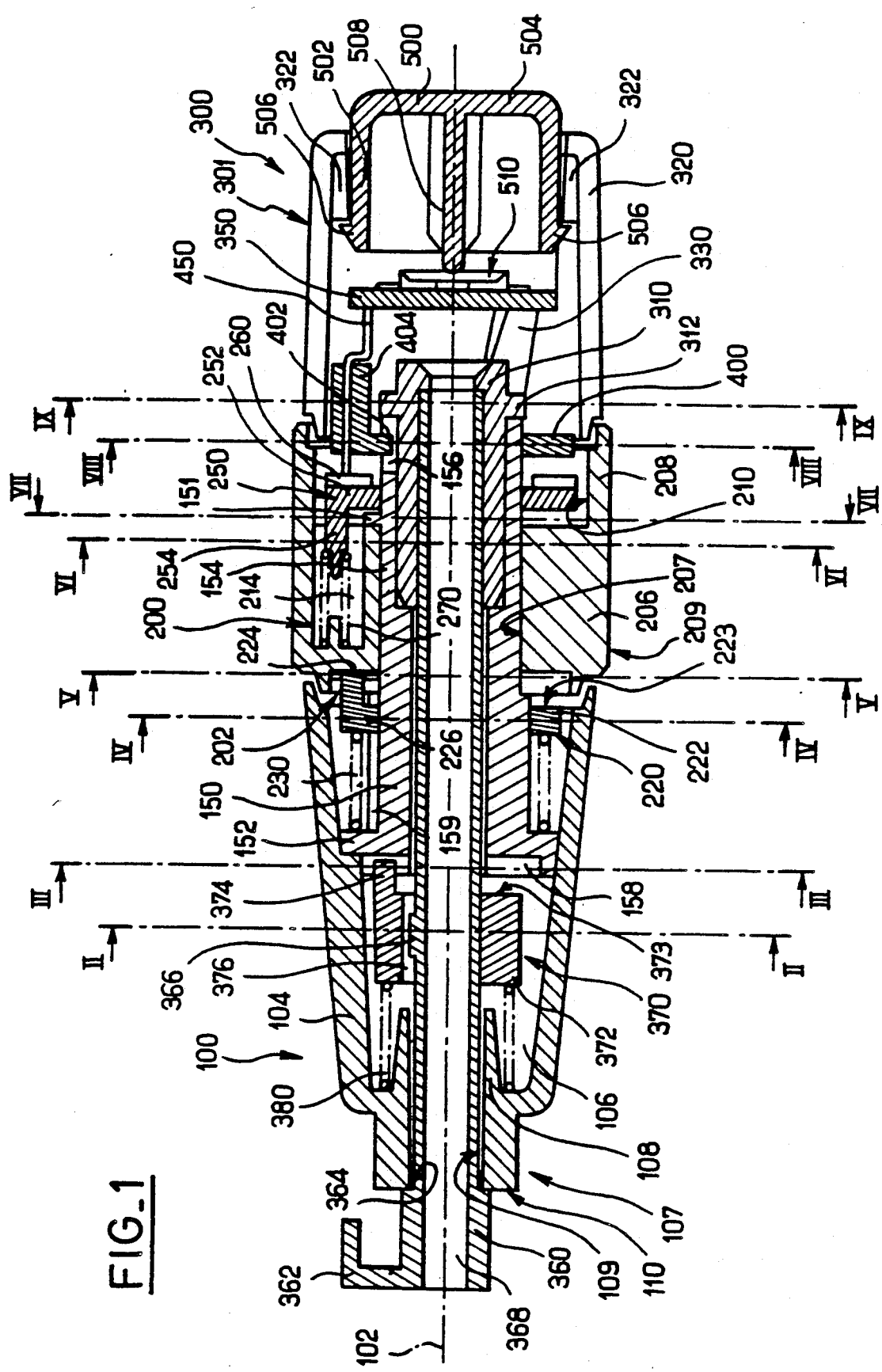
FIG_1

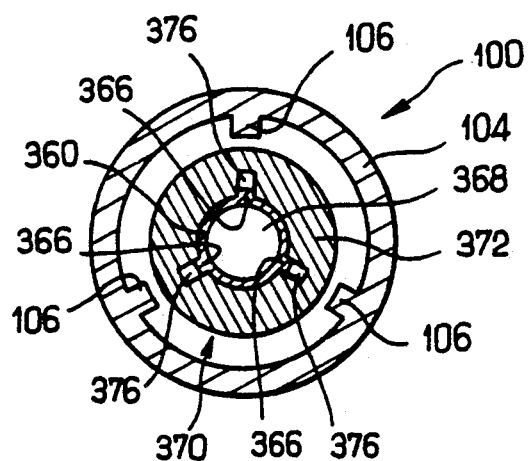
FIG_2
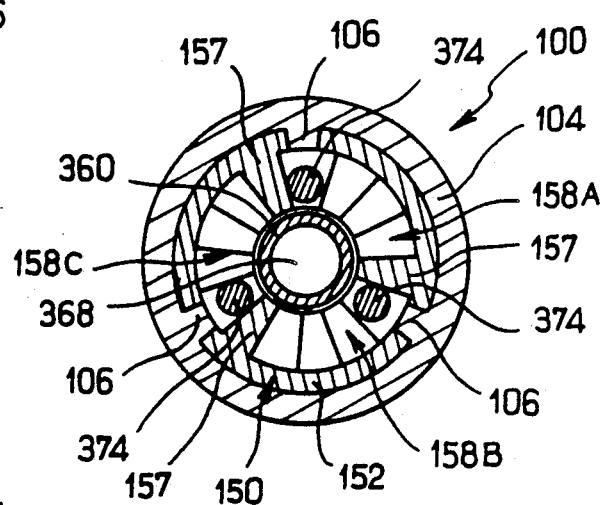
FIG_3
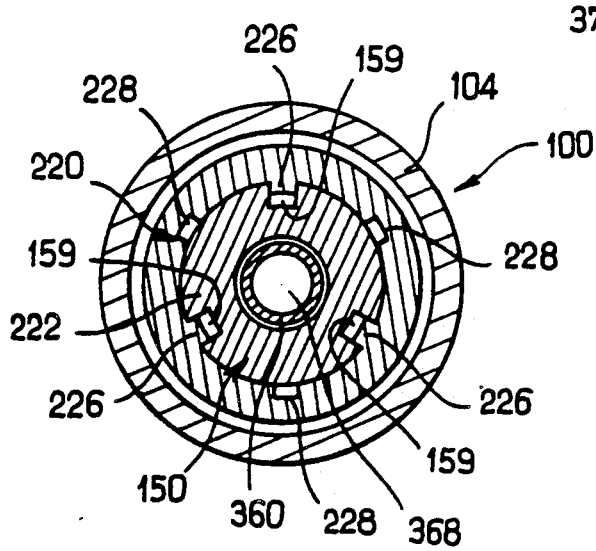
FIG_4
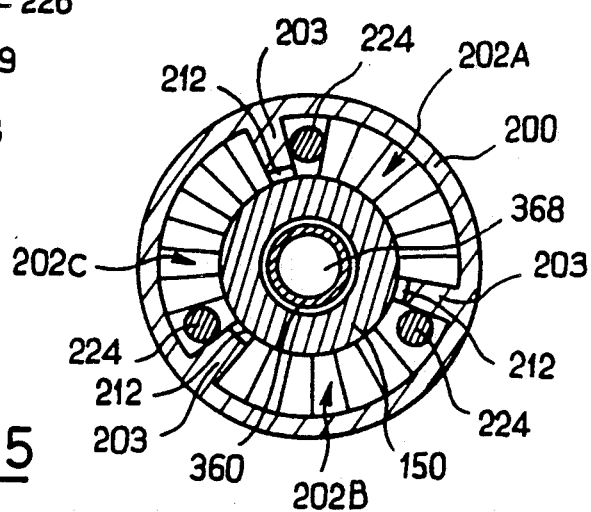
FIG_5

5,003,132

CONTROL LEVER FOR A MOTOR VEHICLE

BACKGROUND OF THE INVENTION

The present invention relates to a control lever, in particular for a motor vehicle.

BRIEF SUMMARY OF THE INVENTION

The object present invention is to provide a control lever fitted with two control rings capable of rotating independently of each other on a common body for implementing two independent switching effects.

To this end, the present invention provides a control lever which comprises:

a fixed body, a first control ring, mounted to rotate on the body and provided with a first circuit board extending generally perpendicularly to its axis of rotation;

a second control ring, coaxial with the first control ring, mounted to rotate relative to the body, and provided with a second circuit board, extending generally perpendicularly to its axis of rotation; and at least one electrical conductor extending generally parallel to the axis of rotation of the ring and prevented from rotating relative to the body, respective ends of said conductor resting in rubbing contact against each of the two circuit boards.

BRIEF DESCRIPTION OF THE DRAWINGS

Other characteristics, and advantages of the present invention appear from reading the following detailed description made by way of non-limiting example and with reference to the accompanying drawings, in which:

FIG. 1 is a diagrammatic axial section through a control lever in accordance with the present invention;

FIG. 2 is a cross-section along the line II—II through the control lever illustrated in FIG. 1;

FIG. 3 is a cross-section along the line III—III through the control lever illustrated in FIG. 1;

FIG. 4 is a cross-section along the line IV—IV through the control lever illustrated in FIG. 1;

FIG. 5 is a cross-section along the line V—V through the control lever illustrated in FIG. 1;

DETAILED DESCRIPTION OF THE INVENTION

Figure 6:
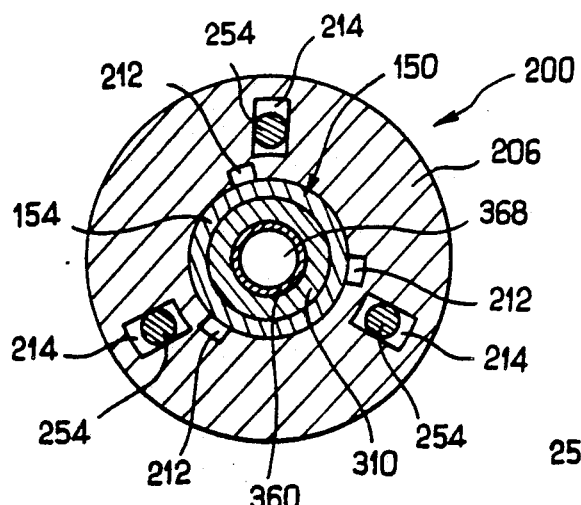
FIG. 6 is a cross-section along the line VI—VI through the control lever illustrated in FIG. 1.

In the following description, the term "front" is used to designate the end of the lever shown on the right of FIG. 1 and the term "rear" is used to designate the end of the lever shown to the left in FIG. 1.

As mentioned above, the control lever of the invention essentially comprises a fixed body 100 and two rotary control rings referenced 200 and 300.

The body 100 comprises a sleeve 104. The axis of the sleeve 104 is referenced 102. The outside surface of the sleeve 104 may be provided in numerous different ways, and preferably it is generally cylindrical or flared.

In the particular embodiment shown in FIG. 1, the outside surface of the sleeve 104 is generally flared. The same applies to the chamber 106 inside the sleeve 104. However, close to its rear end 107, the sleeve 104 is provided with a collar 108. The collar 108 has a central cylindrical bore 109 of constant diameter and provides rotary guidance in a manner explained below.

In addition to the sleeve 104 the body 100 includes a guide tube 150. The guide tube 150 is essentially constituted by a cylinder centered on the axis 102. The cylinder 150 is provided at its rear end with a flange 152 projecting radially outwardly relative to the axis 102. The periphery of the flange 152 is complementary in shape to the inside surface of the sleeve 104 so as to provide rigid fixing both in rotation and in translation between the guide tube 150 and the sleeve 104. Where appropriate, in order to ensure that the guide tube 150 does not rotate relative to the sleeve 104, the inside surface of the sleeve may be provided with a plurality of longitudinal ribs 106 uniformly distributed around the axis 102. As shown in FIGS. 2 and 3, three such ribs 106 are provided in this way. However, this particular disposition is not limiting. The flange 152 is preferably fixed to the inside surface of the sleeve 104 substantially halfway along the sleeve.

The guide tube 150 projects a considerable distance in front of the sleeve 104. It may be observed that the inside diameter of the cylinder 150 constituting the guide tube is preferably equal to the inside diameter of the bore 109 through the collar 108.

The cylinder 150 constituting the guide tube is also extended at its front end by a cylindrical portion 154 centered on the axis 102 and having a larger inside diameter.

The first control ring 200 is guided to rotate on the guide tube 150 in front of the sleeve 104.

The control ring 200 comprises a cylindrical block 206 provided with a through cylindrical central bore 207. The diameter of the bore 207 is complementary, with a little clearance, to the outside diameter of the guide tube 150, thereby enabling the control ring 200 to rotate relative to the guide tube 150.

The cylindrical block 206 extends forwards in the form of a skirt 208 centered on the axis 102. The outside surface of the skirt 208 extends the outside surface 209 of the cylindrical block 206. The diameter of the internal chamber 210 defined by the skirt 208 is considerably greater than the diameter of the inside bore 207.

The ring 200 is associated with means for indexing its rotation about the axis 102.

These indexing means comprise a ring 220. The indexing ring 220 is placed on the guide tube 150 inside the sleeve 104 and to the rear of the first control ring 200. The indexing ring 220 is prevented from rotating on the guide tube 150, but is capable of moving in axial translation relative thereto.

In the example shown in the accompanying figures, the indexing ring 220 is prevented from rotating relative to the guide tube 150 by means of three teeth 226. These teeth 226 are formed on the inside surface of the indexing ring 220. They are consequently directed towards the axis 102 and they are uniformly distributed about the axis. The teeth 226 penetrate into complementary longitudinal grooves 159 provided in the outside surface of the guide tube 150.

The person skilled in the art will understand that some other number of teeth 226 and complementary grooves 159 could be provided. Where appropriate, a single tooth 226 could be provided together with a single groove 159.

In addition, in a different variant, the above-described disposition for preventing rotation between the indexing ring 220 and the guide tube 150 could be inverted i.e. the teeth could project from the outer surface of the guide tube 150 while the complementary longitudinal grooves could be provided in the inside surface of the indexing ring 220.

The indexing ring 220 is in the form of an annulus 222 centered on the axis 102 and provided with the above-mentioned teeth 226, and the transverse front face 223 of the annulus has a plurality of studs 224. These studs are uniformly distributed around the axis 102 and they extend substantially parallel thereto. In the example shown in the accompanying figures, three studs 224 are thus provided uniformly distributed around the axis 102. However, this disposition is not limiting.

The indexing ring 220 is urged towards the front of the lever by a spiral spring 230. The spring 230 is interposed between the front transverse face of the flange 152 and the rear transverse face of the annulus 222. Thus, the studs 224 press resiliently against the rear transverse face 202 of the first control ring 200. This rear transverse face 202 is shaped to constitute an indexing surface.

More precisely, the rear transverse surface 202 of the control ring 200 is divided into a plurality of notched indexing sectors, there being the same number of sectors as there are studs 224.

Thus, FIG. 5 is a diagram showing three notched sectors 202A, 202B, and 202C on the transverse rear face of the first control ring 200. The various notched sectors 202A, 202B, and 202C are separated from one another by radial walls 203.

When the control ring rotates about the axis 102, the studs 224 pass from notch to notch over the respective associated sectors 202A, 202B, and 202C.

The number of notches provided in each of the sectors 202A, 202B, and 202C defines the number of stable positions for the first control ring 200 when it rotates about the axis 102.

In FIG. 5, eight notches are shown diagrammatically for each of the sectors 202A, 202B, and 202C, which corresponds to eight stable positions for the first control ring 200. Naturally, this disposition is not limiting. The radial walls 203 limit the angle through which the first control ring 200 can be rotated by preventing each stud 224 from going from one sector 202A, 202B, or 202C, to another.

As mentioned above, the spring 203 urges the indexing ring 220 and consequently the first control ring 200 in a forwards direction. However, the forwards displacement of the first control ring 200 is limited by pegs 151 projecting from the outside surface of the portion 154 of the guide tube 150. Thus, as shown in FIG. 1, the resilient urging of the spring 230 causes the front transverse face of the cylindrical block 206 to bear against the pegs 151.

Figure 7:
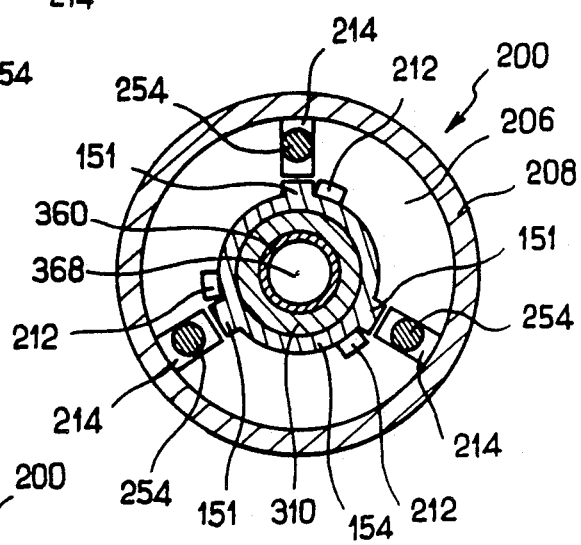
FIG. 7 is a cross-section along the line VII—VII through the control lever illustrated in FIG. 1.

In the example shown in the accompanying figures, and in particular in FIG. 7, three such pegs 151 are uniformly distributed around the axis 102 on the outer surface of the portion 154. Naturally, this disposition is not limiting and a different number of pegs 151 could be provided.

In order to enable the control ring 200 to be engaged on the guide tube 150 by moving rearwards from the front, the cylindrical block 206 of the control ring 200 must be provided on its inside surface 207 with longitudinal grooves 212 that are complementary to the pegs 151. In the example shown in FIGS. 6 and 7, three such longitudinal grooves 212 are provided uniformly spaced around the axis 102. In order to position the control ring 200 on the guide tube 150, the procedure is as follows. The control ring 200 is placed coaxially with the guide tube 150 while ensuring that the pegs 151 are in alignment with the longitudinal grooves 212. The control ring 200 is displaced in translation parallel to the axis 102 over the guide tube 150. The pegs 151 thus slide along the grooves 212. Once the cylindrical block 206 has gone past the pegs 151, the control ring 200 is rotated about the axis 202 in order to take the grooves 212 out of alignment with the pegs 151.

In order to ensure that the grooves 212 cannot be moved into alignment with the pegs 151 in operation, it is preferable for the annular orientation of the pegs 151 and the grooves 212 to be such that when the pegs 151 are received in the grooves 212, then the radial walls 203 provided on the rear transverse face 202 lie over respective ones of the studs 224. In operation, after rotating the control ring 200, the studs 224 come into abutment against the flanks of the radial walls 203 and thereby prevent the longitudinal grooves 212 from being brought back into alignment with the pegs 151.

The indexing ring 220 is preferably engaged on the guide tube 150 going from the front towards the rear prior to the first control ring 200 being engaged thereon. For this reason, the inside surface of the indexing ring 220 is preferably provided with a plurality of longitudinal grooves 228 complementary to the pegs 151. These grooves 228 can be seen in accompanying FIG. 4.

The first control ring 200 is associated with a plate 250 which is placed on the front of the cylindrical block 206 in the internal space defined by the skirt 208. The plate 250 is constrained to rotate with the first control ring 200, but is free to move in axial translation relative thereto.

The plate 250 comprises an annulus 252 guided to rotate on the portion 154 in front of the pegs 151. In addition, the annulus 252 is provided on its rear transverse surface with a plurality of studs 254. The studs are uniformly distributed around the axis 102 and extend substantially parallel thereto. In the example shown in the accompanying figures, and in particular in FIGS. 6 and 7, three studs 154 are thus provided uniformly distributed around the axis 102. Naturally this disposition is not limiting.

The studs 254 penetrate into blind holes 214 provided in the cylindrical block 206. The blind holes 214 are uniformly distributed around the axis 102. They open out in the front transverse face of the cylindrical block 206.

Springs 270 are interposed between the bottoms of the blind holes 214 and steps provided on the studs 254, thereby urging the plate 250 forwards.

The front transverse surface of the plate 250 carries a first circular circuit board 260.

The first circuit board 260 preferably includes an electrically resistive track.

The second control ring 300 is placed in front of the first control ring 200. It is in the form of a single part comprising an inner tube 310, an outer skirt 320, and a plurality of radial fins 330 interconnecting the tube 310 and the skirt 320.

In the example shown in the accompanying figures, three radial fins 330 are thus provided uniformly spaced around the axis 102.

It is preferable for the outside surfaces 209 and 301 of the two control rings 200 and 300 substantially to extend the outside surface of the sleeve 104.

The second control ring 300 carries a second circuit board 350. This board extends perpendicularly to the axis 102. The circuit board 350 may be fixed to the outer skirts 320 and/or to the radial fins 330 by any appropriate conventional means.

The second control ring 300 is associated with a pipe 360. This pipe must be rigid against torsion. It is engaged inside the collar 108 and the guide sleeve 150. To this end, the outside diameter of the pipe 360 is substantially complementary, with a little clearance, to the collar 108 and the guide tube 150.

The front end of the pipe 360 is a force-fit in the inner tube 310. This tube is itself guided to rotate in the portion 154 of the guide tube 150. To this end, the outside diameter of the inner tube 130 should be substantially complementary, with a small amount of clearance, to the inside diameter of the portion 154.

The pipe 360 has an excentric crank 362 at its rear end. The function of the crank is explained below.

The person skilled in the art will readily understand that the second control ring 300 and the pipe 360 being connected to each other are guided to rotate about the axis 102 on the body 100. However, the second control ring 300 and the pipe 360 are prevented from moving in translation relative to the body 100. This is done by the rear end of the pipe 360 being preferably stepped so as to define a forwards facing step 364 as shown in FIG. 1 and suitable for bearing against the rear transverse surface 110 of the body 100. In addition, the inner tube 310 is provided in the vicinity of its front end with an outwardly directed flange 312 suitable for bearing against the front transverse surface of the portion 154. Thus, the second control ring 300 and the associated pipe 360 are prevented from moving in translation relative to the body 100 firstly by means of the step 364 bearing against the rear transverse surface 110 of the body 100 and secondly by means of the flange 312 suitable for bearing against the front transverse surface of the portion 154.

The pipe 360 defines a through internal channel 368. This channel receives wire connections (not shown in the figures in order to simplify illustration) which are connected at one end to the second circuit board 350 and at the other end to electrical accessories.

Figure 8:
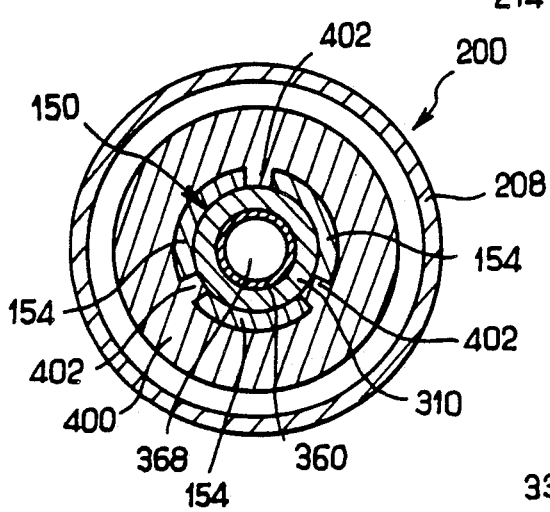
FIG. 8 is a cross-section along the line VIII—VIII through the control lever illustrated in FIG. 1.
Figure 9:
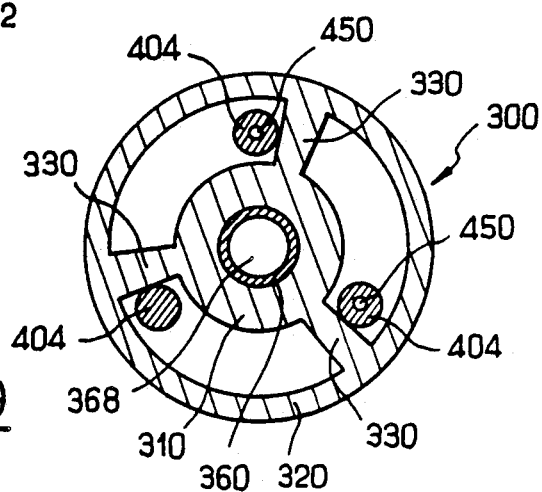
FIG. 9 is a cross-section along the line IX—IX through the control lever illustrated in FIG. 1.

The control lever of the present invention also includes a link ring 400. This is placed at the front end of the portion 154. The link ring 400 is prevented from rotating relative to the portion 154, i.e. relative to the body 100, while nevertheless being capable of moving in axial translation relative thereto. To this end, the link ring 400 has a plurality of teeth 102 on its inside surface. The teeth 402 are directed radially towards the axis 102 and penetrate in longitudinal grooves 156 provided at the front end of the portion 154. In the example shown in accompanying FIG. 8, three such teeth 402 are provided penetrating into three longitudinal grooves 156 uniformly distributed around the axis 102. However, this disposition is not limiting and some different number of teeth 402 and associated grooves 156 could be provided.

Also, where appropriate, an inverse disposition could be adopted. i.e., the teeth could be provided projecting from the outside surface of the portion 154, whereas the link ring 400 could be provided with complementary longitudinal grooves on its inside surface.

The link ring 400 carries electrical conductors 450. These extend substantially parallel to the axis 102 between the first circuit board 260 and the second circuit board 350. The respective ends of the electrical conductors 450 rest against the above-mentioned circuit boards 260 and 350.

The link ring 400 is prevented from rotating relative to the body 100 when the first control ring 200 or the second control ring 300 is rotated, and as a result relative displacement is obtained between the ends of the electrical conductors 450 and the first circuit board 260 or the second circuit board 350. The force exerted by the ends of the electrical conductors 450 on the first circuit board 260 and on the second circuit board 350 is defined by the springs 260 which urge the plate 250 forwards.

The link ring 400 may, where appropriate, be provided with studs 404 that reinforce its support of the electrical conductors 450. The studs 404 are uniformly distributed around the axis 102 on the front transverse surface of the link ring 400. The studs 404 extend substantially parallel to the axis 102 in the spaces defined between the fins 330.

Assuming that the first circuit board 360 is provided on its front surface with at least one annular track of electrically resistive material, it is preferable to provide two electrical conductors 450. One of the electrical conductors 450 is displaced over the resistive track during rotation of the first control ring 200. The other electrical conductor is preferably displaced over an annular track of electrically conductive material connected at one end of the resistive track (with the annular track of electrically conductive material also being provided on the front face of the circuit board 260). The person skilled in the art will readily understand that during rotation of the first control ring 200, the impedance between the two electrical conductors 450 varies regularly in a manner directly representative of the amplitude of rotation of the ring 200. The front ends of the two electrical conductors 450 engage tracks made of electrically conductive material on the rear face of the second circuit board 350. These electrically conductive tracks are themselves connected to conductors engaged in the channel 368 of the pipe 360, as mentioned above. Thus, the first circuit board 360 constitutes a variable resistance whose output impedance is directly proportional to the angular position of the first control ring 200. This disposition may be used, for example, to control the speed at which windscreen wipers operate.

The second control ring 300 is associated with rotary indexing means. These indexing means comprise an indexing ring 370 constituted by an annulus 372 engaged on the pipe 360 inside the sleeve 104 behind the flange 152.

The annulus 372 is prevented from rotating relative to the pipe 360 but is free to move in translation thereover.

To do this, in the example shown in the figures, three teeth 366 are provided uniformly distributed around the axis 102 projecting from the outside surface of the pipe 360. The teeth 366 penetrate into respective longitudinal grooves 376 provided in the inside surface of the annulus 372.

Naturally, a different number of teeth 366 and longitudinal grooves could be used.

Also, an inverse disposition could be used, i.e. the teeth could be provided on the inside surface of the indexing annulus 372 and the complementary longitudinal grooves on the outside surface of the pipe 360.

The front transverse surface 373 of the annulus 372 is provided with a plurality of studs 374 uniformly distributed around the axis 102. In the non-limiting example shown in the accompanying figures, three such studs 374 are provided. The indexing ring 370 is urged forwards by a spring 380. The spring 380 is interposed between the base of the sleeve 104 and the rear transverse surface of the annulus 372, and on the collar 108. Thus, the studs 374 rest against the rear transverse surface 158 of the flange 152. This rear transverse surface 158 is divided into the same number of notched sectors as there are studs 374. Thus, in the example shown in accompanying FIG. 3, three notched sectors 158A, 158B, and 158C are provided. The sectors 158A, 158B, and 158C are separated by radial walls 157 projecting from the rear transverse surface 158. During rotation of the second control ring 300, and thus of the pipe 360, about the axis 102, the studs 374 pass from notch to notch within respective ones of the sectors 158A, 158B, and 158C. The radial walls 157 prevent the studs 374 from moving from one of the sectors 158A, 158B, and 158C, to another. The number of notches provided within each sector 158A, 158B, and 158C defines the number of stable positions for the second control ring 300. In the diagrammatic representation of FIG. 3, four such notches are provided in each sector 158A, 158B, and 158C.

In accordance with an advantageous characteristic of the invention, the second control ring 300 is also equipped with a pushbutton 500. The pushbutton is capable of moving in translation parallel to the axis 102 in order to control a switch element 510 carried on the front transverse face of the second circuit board 350. The switch element 510 is advantageously a spring toggle element also serving to return the pushbutton 500 towards its rest position. The pushbutton 500 may be made in numerous different ways. In the example shown in FIG. 1, it comprises a cylindrical skirt 502 closed at its front end by a transverse wall 504. The rear end of the outside surface of the cylindrical skirt is provided with teeth 506 which rest against fins 322 integral with the inside surface of the skirt 320 in order to prevent the pushbutton 500 being removed. The wall 504 has a central rod 508 on its inside surface extending rearwards along the axis 102 towards the switch element 510. Thus, when the pushbutton 500 is urged rearwards by translation along the axis 102, its central rod 508 can actuate the switch element 510 in order to change its state. Since the switch element 510 is a resilient toggle element, it serves to urge the pushbutton 500 back towards its return position. Otherwise a return spring needs to be associated with the button 500.

Preferably, the front end of the sleeve 104, the front and rear ends of the first control ring 200, and the rear end of the second control ring 300 are all shaped so that together they define baffle structures illustrated diagrammatically in FIG. 1 and suitable for limiting the extent to which dust and other foreign bodies penetrate into the lever.

The above-described control lever is assembled as follows.

The pipe 360 is engaged inside the collar 108 from the rear. The step 364 then bears against the rear transverse surface 110 of the body 100.

The spring 380 and the indexing ring 370 are engaged from the front on the pipe 360 inside the sleeve 104. Thereafter the guide tube 150 is engaged on the pipe 360 and fixed on the inside surface of the sleeve 104. The spring 230 and the indexing ring 220 are engaged from the front on the guide tube 150. It is recalled that to do this it is necessary to begin by aligning the longitudinal grooves 228 provided in the indexing ring 220 with the pegs 151 on the guide tube 150. Once the indexing ring 220 has gone past the pegs 151, the ring 220 can be rotated about the axis 102.

The first control ring 200 is then engaged on the guide tube 150 from the front. Here again, in order to do this, it is necessary to begin by aligning the grooves 212 with the pegs 151. After engagement has taken place, the radial walls 203 bear against the studs 224. The spring 230 is compressed. Thereafter the first control ring 200 is rotated about the axis 102. The studs 224 then engage against corresponding ones of the notched sectors 202. Co-operation between the radial wall 203 and the studs 224 prevents any subsequent alignment of the longitudinal grooves 212 and the pegs 151. By virtue of the urging by the spring 230, the front transverse surface of the cylindrical block 206 comes to rest against the pegs 151. The springs 270 are engaged in the blind holes 214 and then the plate 250 is engaged from the front over the guide tube 150, taking care that the studs 254 are in alignment with the blind holes 214.

The link ring 400 is engaged in turn from the front on the guide tube 150, taking care to keep the teeth 402 in alignment with the longitudinal grooves 156. Then, the second control ring 300 fitted with the second circuit board 350 and the pushbutton 500 is engaged from the front and in the guide tube 150. During this operation, the front end of the pipe 360 is force-fitted inside the inner tube 310. As mentioned above, this simultaneously ensures a rigid connection between the pipe 360 and the second control ring 300, and it prevents the assembly 360–300 formed in this way from moving in translation relative to the fixed body 100.

The control lever is then ready for use.

A user may rotate the first control ring 200 in rotation about the axis 102. This rotation is indexed by the indexing ring 220. Since the electrical conductors 450 are prevented from rotating relative to the body 100, rotation of the first control ring 200 causes the tracks provided on the first circuit board 260 to move relative to the rear ends of the electrical conductors 450. As mentioned above, this disposition may be used to define a change in the impedance between the electrical conductors 450, e.g. for the purpose of controlling the speed at which the windscreen wiper components move. Where appropriate, relative displacement between the circuit board 260 and the electrical conductor 450 may be used for generating a switching effect instead of an impedance-varying effect.

Similarly, a user may rotate the second control ring 300 about the axis 102. This rotation is indexed by the ring 370. Rotation of the control ring 300 about the axis 102 displaces the crank 360 which is suitable for displacing a switching carriage or slide integrated in conventional manner in an electrical switch, for example. It may be observed that insofar as the front ends of the electrical conductors 450 rest against circular electrically conductive tracks centered on the axis 102 and provided on the second circuit board 350, rotation of the second control ring 300 has no effect on the control signal delivered by the first ring 200.

Rotation of the second control ring 300 may be used, for example, for switching on windscreen wiper components, at selected rates or speeds, or else it may be used for switching on windscreen washing components.

Pushing the pushbutton 500 in translation may also be used for controlling accessory electrical functions.

Naturally the present invention is not limited to the particular embodiment described above but extends to any variant in accordance with the spirit thereof.

For example, and where appropriate, it may be observed that the indexing ring 220 could be prevented from rotating relative to the first control ring 200 while being left free to move in translation relative thereto, and it could be urged resiliently against a notched indexing ramp fixed provided on the body 100.

Similarly, the indexing ring 370 could be prevented from rotating relative to the body 100 while being left free to move in translation relative thereto, and it could be urged resiliently against a notched indexing ramp fixed to the pipe 360.

I claim:

1. A control lever for a motor vehicle, said lever comprising:
    a fixed body;
    a first control ring, mounted to rotate on the body about an axis of rotation;
    a plate mounted to rotate on the body about said axis of rotation of the first control ring, said plate being connected to the first control ring to prevent said plate from rotating relative to the first control ring while being capable of moving in axial translation relative thereto;
    a first circuit board extending generally perpendicularly to the axis of rotation of said first control ring, the first circuit board being carried by said plate so as to rotate with the plate about its axis of rotation;
    a second control ring, coaxial with the first control ring, mounted to rotate relative to the body, about the same axis of rotation as said first control ring,
    a second circuit board, extending generally perpendicularly to the axis of rotation of said second control ring, said second circuit board being connected to said second control ring so as to rotate with this second control ring about its axis of rotation;
    a link ring provided between the two circuit boards and being mounted on the body to prevent said link ring from rotating relative to the body,
    at least one electrical conductor extending generally parallel to the axis of rotation of the rings, through the link ring, so that said conductor is prevented from rotating relative to the body, and
    means resiliently urging the plate towards the second circuit board, respective ends of said conductor resting in rubbing contact against each of the two circuit boards.

2. A control lever according to claim 1 further characterized by at least two electrical conductors extending generally parallel to the axis of rotation of the control rings, through said link ring, so that said electrical conductors are prevented from rotating relative to the body, with respective ends of each of the conductors bearing in rubbing contact against each of the two circuit boards.

3. A control lever according to claim 1 further characterized by said link ring being guided on the body so as to move in translation thereon parallel to the axis of rotation of said control rings.

4. A control lever according to claim 1 further characterized in that the first and second control rings are axially adjacent.

5. A control lever according to claim 1 further characterized in that a guide tube is fixed to the body, and the first ring is guided in rotation on said guide tube, whereas the second control ring is provided with an inner tube engaged in the guide tube so that the second control ring is guided in rotation on said guide tube.

6. A control lever according to claim 5 characterized in that the second ring further comprises an outer skirt and a plurality of radial fins which interconnect the inner tube and the outer skirt.

7. A control lever according to claim 6 characterized in that said radial fins define spaces therebetween, and each electrical conductor extends in one of said spaces.

8. A control lever according to claim 5, characterized in that, a central pipe which is coaxial with the axis of rotation of the control rings and which is provided with an eccentric crank, is fixed on the inner tube.

9. A control lever according to claim 8 characterized in that conductor wires connected to the second circuit board are provided in the central pipe.

10. A control lever according to claim 1 characterized in that a switch element is carried by the second circuit board and the second ring carries a pushbutton in front of said switch element so that actuations of said pushbutton control commutation of said switch element.

11. A control lever according to claim 10 characterized in that at least one of the rings is associated with rotary indexing means.

12. A control lever according to claim 11 characterized in that the indexing means associated with the first control ring comprises an annulus guided in axial translation on the body and resiliently urged against an indexing ramp provided on the first control ring.

13. A control lever according to claim 11 characterized in that the indexing means associated with the second control ring comprises an annulus guided in axial translation on the second control ring and urged resiliently against an indexing ramp provided on the body.

14. A control lever for a motor vehicle, said lever comprising:
    a fixed body;
    a guided tube fixed to the body, said guide tube having a central axis;
    a first control ring mounted on the guide tube so as to rotate about an axis of rotation which is coaxial with the central axis of the guide tube;
    a first circuit board extending generally perpendicularly to the axis of rotation of said first control ring, the first circuit board being connected to the first control ring so as to rotate with said first control ring about said axis of rotation;
    a second control ring which is provided with an inner tube engaged in the guide tube so that the second control ring is guided in rotation about the same axis of rotation as said first control ring;
    a second circuit board extending generally perpendicularly to the axis of rotation of said second control ring, said second circuit board being connected to said second control ring so as to rotate with the second control ring about its axis of rotation;
    a link ring provided between the two circuit boards and being mounted on the body so as to be prevented from rotating relative to the body, and at least two electrical conductors extending generally parallel to the axis of rotation of the control rings, through the link ring, so that said conductors are prevented from rotating relative to the body, with respective ends of each of the conductors bearing in rubbing contact against each of the two circuit boards.

15. A control lever according to claim 14, further comprising a plate mounted to rotate on the guide tube and about said axis of rotation of the first control ring, said plate being further connected to the first control ring so as to be prevented from rotating relative to the first control ring while being capable of moving in axial translation relative thereto, and wherein the first circuit board is fixed on said plate.

16. A control lever according to claim 15 further comprising means for resiliently urging the plate towards the second circuit board.

17. A control lever according to claim 14 wherein the second control ring further comprises an outer skirt and a plurality of radial fins which interconnect the inner tube and the outer skirt.

18. A control lever according to claim 17 wherein said radial fins define spaces therebetween, and each electrical conductor extends in one of said spaces.

19. A control lever according to claim 14 wherein a central pipe which is coaxial with the axis of rotation of the control rings and which is provided with an eccentric crank and is fixed on the inner tube of the second control ring.

20. A control lever according to claim 19 wherein conductor wires connected to the second circuit board are provided in central pipe.

21. A control lever according to claim 14 wherein a switch element is carried by the second circuit board and the second control ring carries a pushbutton in front of said switch element so that actuations of said pushbutton control commutation of said switch element.

22. A control lever according to claim 14 wherein at least one of the control rings is provided with rotary indexing means.

* * * * *